US005847947A

United States Patent [19]
Pan et al.

[11] Patent Number: 5,847,947
[45] Date of Patent: Dec. 8, 1998

[54] HIGH VOLTAGE TRANSFORMER

[75] Inventors: Tsung-Ming Pan, Ping Tung; Jang-Tzeng Lin, Hsinchu; Hui Pin Yang, Taipei, all of Taiwan

[73] Assignee: Industrial Technology Research Institute, Hsinchu Hsien, Taiwan

[21] Appl. No.: 15,321

[22] Filed: Jan. 29, 1998

[51] Int. Cl.[6] .............................. H02M 3/18; H01F 27/30

[52] U.S. Cl. .............................. 363/61; 336/83; 336/200; 336/212; 336/218; 336/233

[58] Field of Search .................................. 363/60, 59, 61; 336/175, 185, 83, 212, 218, 232, 233, 200

[56] References Cited

U.S. PATENT DOCUMENTS

| | | | |
|---|---|---|---|
| 4,816,784 | 3/1989 | Rabjohn | 336/183 |
| 5,353,001 | 10/1994 | Meinel et al. | 336/83 |
| 5,392,020 | 2/1995 | Chang | 336/200 |
| 5,430,424 | 7/1995 | Sato et al. | 336/200 |
| 5,543,773 | 8/1996 | Evans et al. | 336/183 |
| 5,583,424 | 12/1996 | Sato et al. | 323/282 |
| 5,583,474 | 12/1996 | Mizoguchi et al. | 336/83 |
| 5,598,327 | 1/1997 | Somerville et al. | 363/131 |
| 5,694,030 | 12/1997 | Sato et al. | 323/282 |
| 5,754,088 | 5/1998 | Fletcher et al. | 336/200 |
| 5,757,633 | 5/1998 | Bowles | 363/71 |
| 5,781,093 | 7/1998 | Grandmont et al. | 336/232 |

*Primary Examiner*—Adolf Berhane
*Attorney, Agent, or Firm*—McDermott, Will & Emery

[57] ABSTRACT

The structure of a high voltage transformer is disclosed. The transformer structure has a magnetic core, a multi-layer printed circuit board (PCB), a conductor winding, a voltage doubling rectifier means, a magnetic means, a supporting means, and insulated oil. The multi-layer PCB has spiral coils used as a secondary winding. A conductor windings is used as a primary winding. The voltage doubling rectifier means includes an anode voltage doubling rectifier circuit and a cathode voltage doubling rectifier circuit which are respectively formed on a first and a second insulated boards. The two voltage doubling rectifier is used to increase the voltage gain. The magnetic means has a top magnetic cap and a bottom magnetic cap. The mullet-layer PCB and the voltage doubling rectifier means are interposed between the top and the bottom magnetic cap for decreasing the leakage magnetic flux. The breakdown distance can be maintained in an appropriate distance by using the supporting means. The insulated oil serving as an insulated material is filled into the transformer structure to increase the durability of breakdown voltage.

10 Claims, 6 Drawing Sheets

HIGH VOLTAGE TRANSFORMER

BACKGROUND OF THE INVENTION

1. Field of the Invention

The present invention relates to a high voltage transformer, and more particularly to a planar transformer having a sandwich structure with high voltage ratio and tolerance with high breakdown voltage.

2. Description of the Prior Art

In recent years, electronic devices of various types have been miniaturized. Magnetic elements like inductors and transformers are indispensable to the power-supply section of each electronic component. The inductors and transformers can neither be made smaller nor be integrated with the other circuit components, whereas the other circuit sections have successfully been made much smaller in the form of LSIs. Therefore the volume of the power-supply section is much greater than that of the other sections. Thus the combination of the both has an inevitable large volume.

Referring to FIG. 1, a conventional transformer applied in high voltage power supply is shown. The magnetic core 10 is composed of a plurality of I-cores or two U-cores. Two conductor windings, using respectively as a primary winding 12 and a secondary winding 14, are spiraled around a leg 10*a* and a leg 10*b* of the core 10, respectively. Although the transformer with such structure has a large voltage gain and a high voltage ratio, the size of the transformer can not be reduced, especially when the level of the required output voltage becomes large. In addition, the conventional transformer is hard to maintain a uniform quality control on the winding structure in the manufacturing process and thus influence the magnetic and electrical characteristics of the products.

To reduce the size of the magnetic elements and solve the quality control problem, small planar inductors and planar transformers have been designed. A conventional planar inductor includes a spiral planar coil, two insulation layers sandwiching the coil, and two magnetic plates sandwiching the coil and insulation layers. A conventional planar transformer includes two spiral planar coils, used as a primary winding and a secondary winding, respectively, three insulation layers sandwiching these coils, and two magnetic layers sandwiching the coils and the insulation layers. The spiral planar coils incorporated in the inductor and the transformer can be either of the two alternative types. The first type is formed by one spiral conductor. The second type is composed of an insulation layer and two spiral conductors that are mounted on the two major surfaces of the insulation layer. These planar elements are disclosed in K. Yamasawa et. al, High-Frequency of a Planar-Type Microtransformer and Its Application to Multilayered Switching Regulators, IEEE Trans.Mag., Vol. 26, No. 3, May 1990, pp. 1204–1209. Planar coils are used in planar inductors. Spiral coils are the most preferable due to their great inductance and their good Q coefficient.

In fact, planar inductors having spiral planar coils have been manufactured, one of which is schematically illustrated in FIG. 2. As FIG. 2 shows, the planar inductor includes a spiral planar coil 20 shaped like a squire plate, two polymid films 22*a*, 22*b* sandwiching the coil 20, and two Co-base amorphous alloy ribbons 24*a*, 24*b* sandwiching the coil 20 and the polymid films 22*a*, 22*b* are prepared by cutting a Co-based amorphous alloy foil made by rapidly quenching cooling the melted alloy.

Additionally, another planar magnetic element is disclosed also in U.S. Pat. No. 5,583,474. As FIG. 3 shows, this inductor has two insulation layers 32*a* and 32*b*, two magnetic layers 34*a* and 34*b*, and a spiral planar coil 30. The coil 30 is sandwiched between the insulation layers 32*a* and 32*b*. The unit consisting of the insulation layers 32*a*, 32*b* and the coil 30 is sandwiched between the magnetic layers 34*a* and 34*b*. The spiral planar coil 30 is square, each side having a length $a_0$. The magnetic layers 34*a* and 34*b* are also square, each side having a length w. They have the same thickness t. They are spaced apart from each other by a distance g.

FIG. 4 is also an exploded view illustrating another type of a planar inductor. The planar inductor comprises three insulation layers 42*a*, 42*b*, 42*c*, two magnetic layers 44*a*, 44*b*, two spiral planar coils 40*a*, 40*b*, and a through-hole conductor 46. The insulation layer 42*b* is interposed between the coils 40*a* and 40*b*. The unit consisting of the insulation layer 42*b* and the coils 40*a*, 40*b* is sandwiched between the other insulation layers 42*a* and 42*b*. The unit consisting of the insulation layers 42*a*, 42*b*, 42*c* and the coils 40*a*, 40*b* is sandwiched between the magnetic layers 44*a* and 44*b*. The through-hole conductor 46 extends through the insulation layer 42*b* and electrically connects the spiral planar coils 40*a* and 40*b*. The spiral planar coils 40*a* and 40*b* shaped in a squares having a length $a_0$ at each side. The magnetic layers 44*a* and 44*b* are also squares, each side having a length w, and have the same thickness t. The magnetic layers 44*a* and 44*b* are spaced apart from each other by a distance g.

Both planar inductors shown in FIG. 3 and FIG. 4, respectively, can be advantageous in the following two respects when appropriate values are selected for $a_0$, w, t and g:

(1) They have an effective magnetic shield, and the leakage magnetic flux is therefore very small.

(2) They have a sufficiently high inductance.

Either planar inductor can be formed on a glass substrate, by means of thin-film process described above. Alternatively, it can be formed on any other insulated substrate (e.g., a substrate made of a high-molecular material such as polymid). The magnetic flux generated by one spiral planar coil or a plurality of spiral planar coils must be prevented from leaking from the planar inductors. Otherwise, the leakage magnetic fluxes of either inductor adversely influence the other electronic components arranged very close to the inductor and formed on the same chip, thus forming a hybrid integrated circuit. According to the above statement about both inductors, the ratio between the width w of either magnetic layer and the width $a_0$ of the square planar coil or coils should be set at an optimum value so that the magnetic fluxes generated by the coil or coils are prevented from leaking.

As is known in the art, the characteristics of planar magnetic elements greatly depend on their structure parameters and the characteristics of the planar coils and magnetic layers. Additionally, as that has been pointed out, planar inductors and planar transformers have a limit of transformer breakdown voltage, especially depend on inserting the insulated material between planar coils, insulation layers and magnetic layers. Typically, the insulated material is ceramic around the spiral windings in the multi-layered planar inductors. This structure has an insufficient breakdown voltage such that the spark discharge will be generated. Therefore, the conventional transformer can hardly met the requirement of sufficient breakdown voltage, no leakage fluxes and sufficiently small integrated LC-circuit sections.

SUMMARY OF THE INVENTION

It is a first object of the present invention in providing a planar transformer with multi-layered spiral windings on printed circuit boards. The planar transformer can be manufactured with uniform quality control and can effectively increase the voltage gain with a high voltage output.

It is a second object of the present invention in providing a planar transformer having an appropriate breakdown distance to effectively improve the breakdown voltage.

It is a third object of the present invention to provide a planar transformer to reduce the leakage magnetic fluxes.

In accordance with the above objects, the present invention provides a high voltage transformer. A magnetic core is used as a medium that enables transfer of power. A plurality of coils served as a secondary winding is formed in a multi-layered printed circuit board (PCB), and the coils are spiraled around one leg of the magnetic core. A conductor windings using as a primary winding 12, is spiraled around another leg of the magnetic core. An anode doubling rectifier circuit and a cathode doubling rectifier circuit are respectively formed on different insulated boards. A voltage doubling rectifier circuit unit is composed of the anode doubling rectifier circuit and the cathode doubling rectifier circuit. By using the anode doubling rectifier circuit and the cathode doubling rectifier circuit sandwiching the multi-layer PCB, the voltage gain of the transformer can be increased. The voltage doubling rectifier circuit unit and multi-layer PCB are sandwiched by two magnetic caps, which results the reduction of the magnetic fluxes of the transformer. A plurality of supports are used to fix the multi-layered PCB, the voltage doubling rectifier circuit unit and two magnetic caps. Additionally, an appropriate breakdown distance can be provided by this way, and the breakdown voltage can be increased by using insulated oil.

DESCRIPTION OF THE PREFERRED EMBODIMENT

Figure 1:
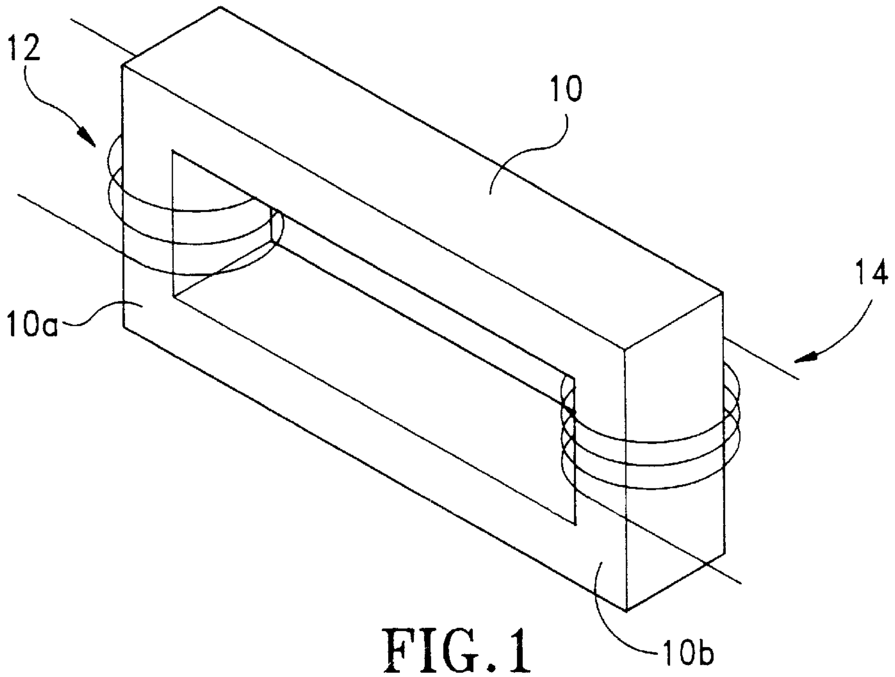
FIG. 1 (Prior Art)
FIG. 1 is a structural view of showing a conventional transformer applied in high voltage power supply.
Figure 2:
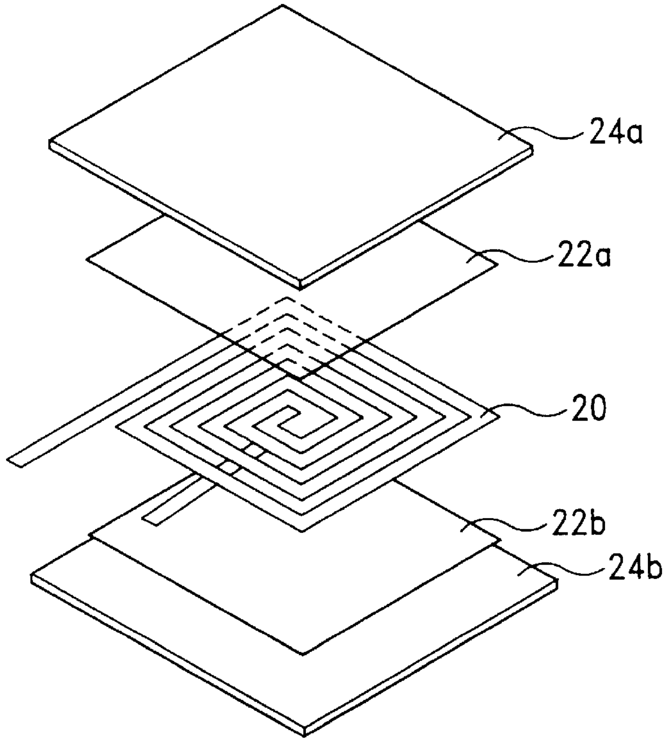
FIG. 2 (Prior Art)
FIG. 2 is a structural view of showing a first planar transformer according to the conventional method.
Figure 3:
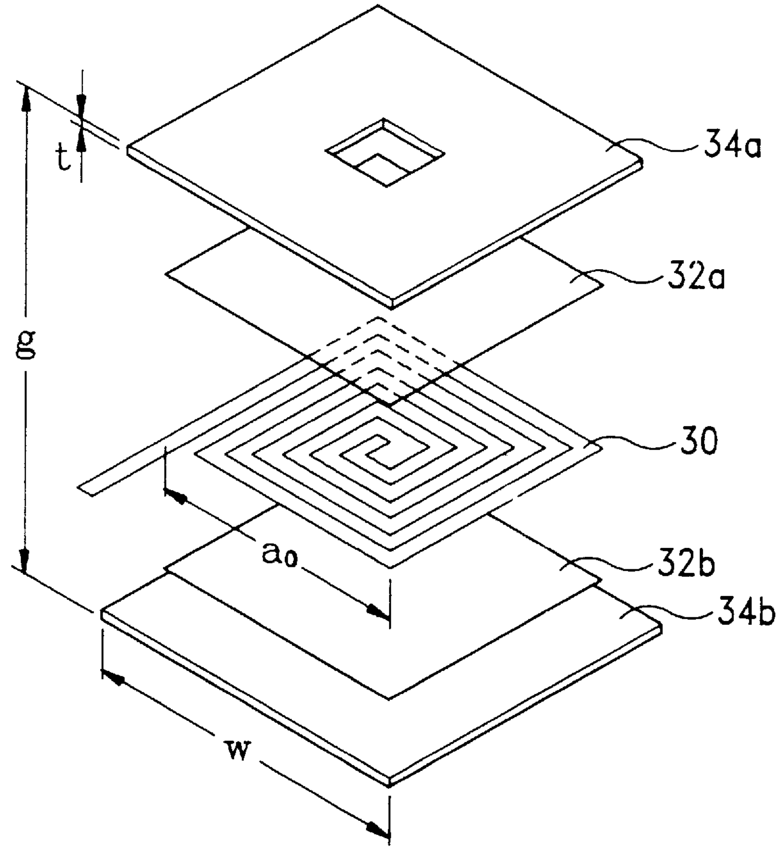
FIG.3 (Prior Art)
FIG. 3 is a structural view of showing a second planar transformer according to the conventional method.
Figure 4:
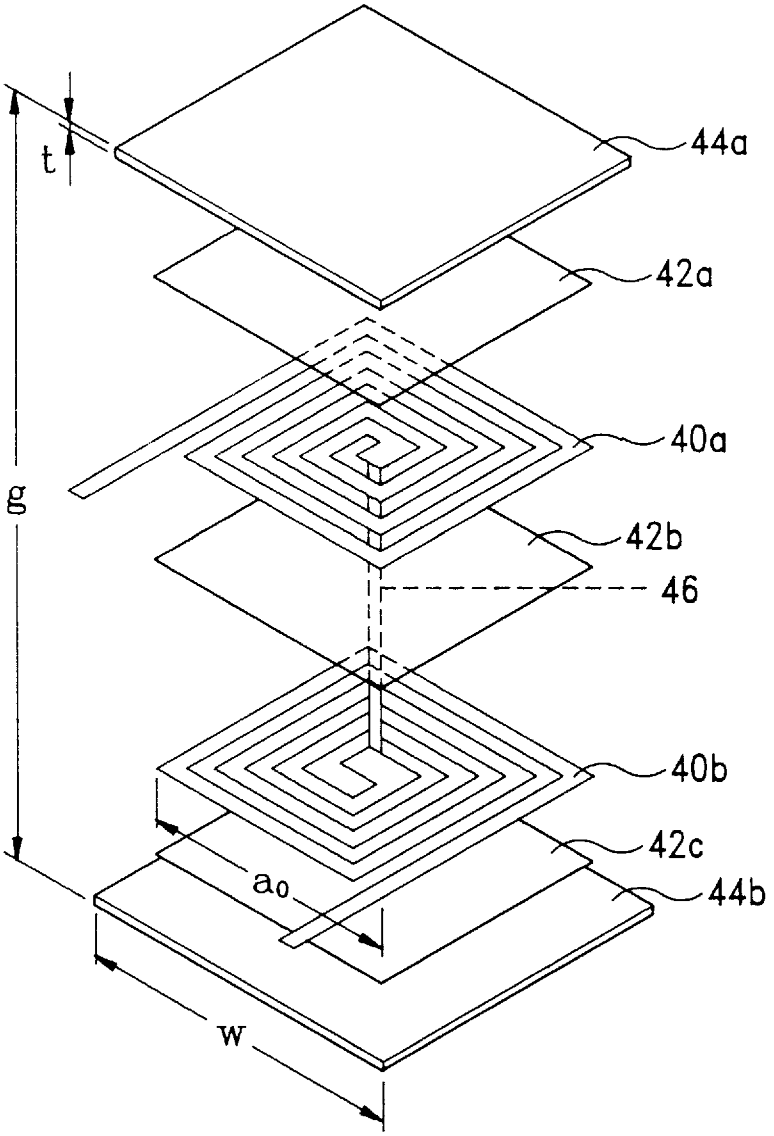
FIG.4 (Prior Art)
FIG. 4 is a structural view of showing a third planar transformer according to the conventional method.
Figure 5:
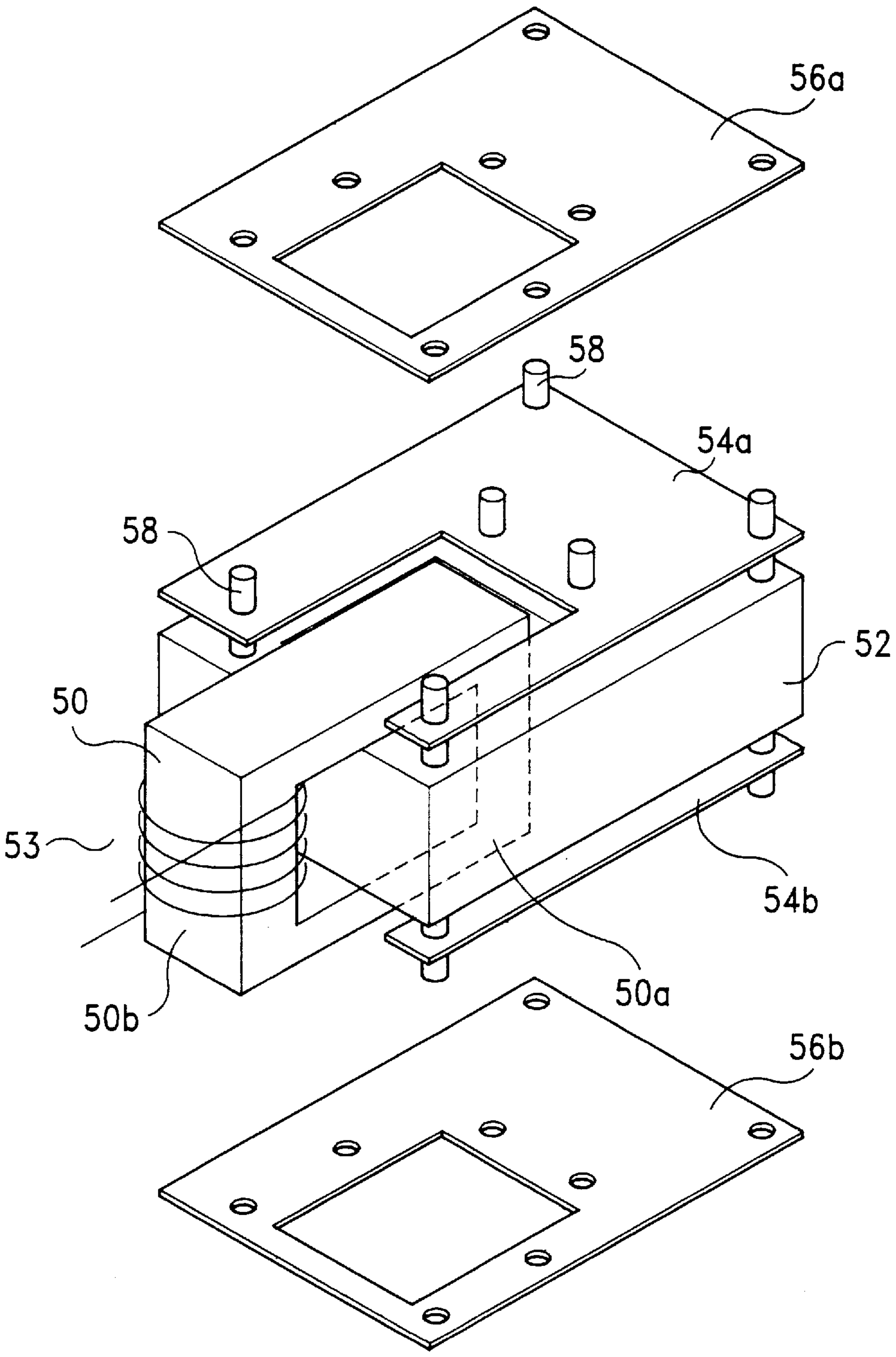
FIG. 5 is a structural view of showing a planar transformer according to the present invention.
Figure 6:
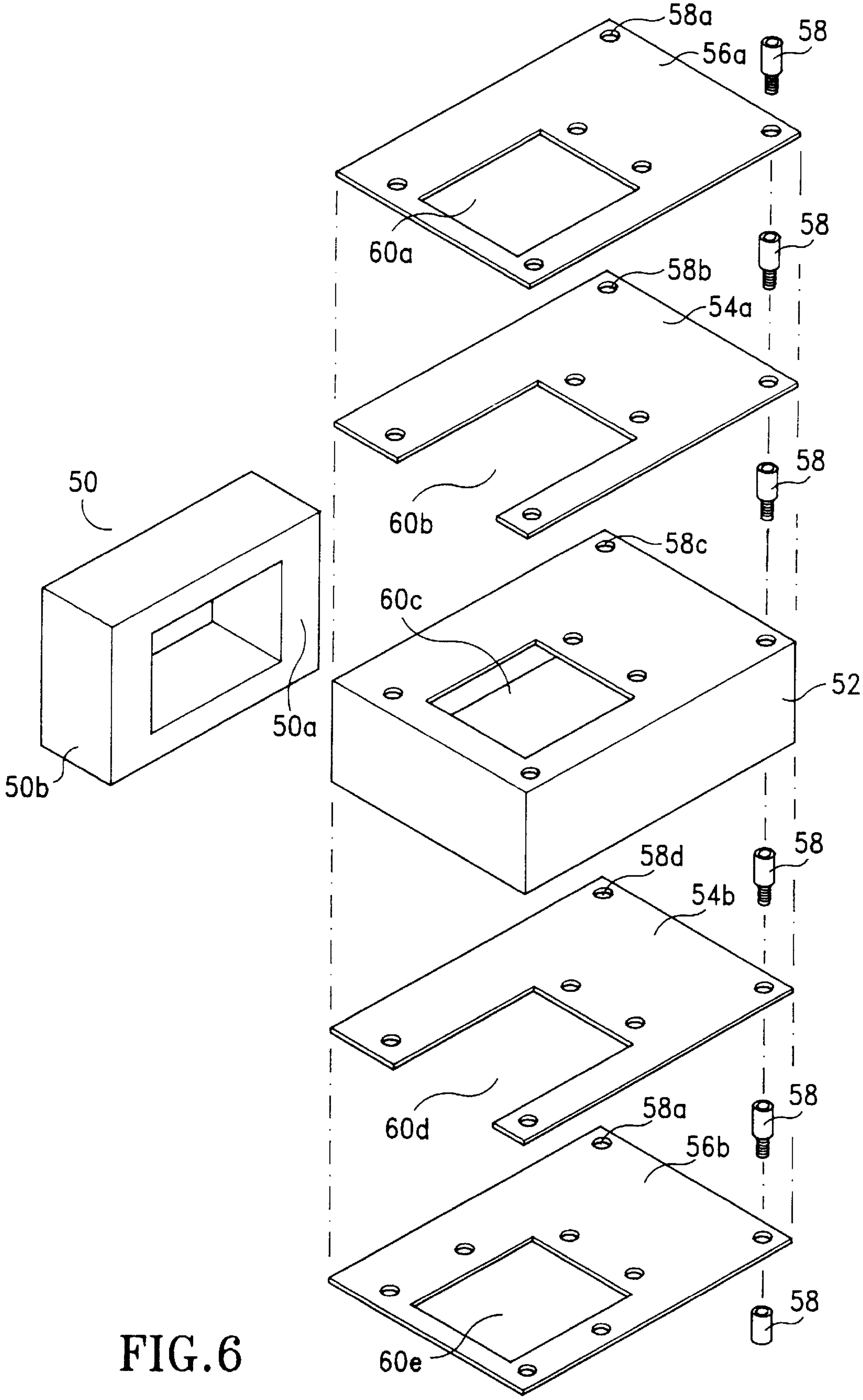
FIG. 6 is a separated view of showing a planar transformer according to the present invention.

FIG. 5 and FIG. 6 are the structural views of the present invention. The planar transformer structure includes a magnetic core 50 that is used as a power transformation medium. A multi-layer printed circuit board (PCB) 52 has a plurality of spiral planar coils that are used as a secondary winding. The second winding spirals around a leg 50*a* of the core 50. A conductor windings using as a primary winding 53 is spiraled around another leg 50*b* of the core 50. The multi-layer printed circuit board (PCB) 52 has an opening 60*c* that the leg 50*a* of the core 50 is passed through, and a plurality of windings are spiraled around the leg 50*a*. A voltage doubling rectifier circuit unit is made of an anode voltage doubling rectifier circuit 54*a* and a cathode voltage doubling rectifier circuit 54*b* which are respectively formed on a first and a second insulated boards 54*a*, 54*b*. The multi-layer printed circuit board (PCB) 52 is sandwiched between the anode voltage doubling rectifier circuit 54*a* and the cathode voltage doubling rectifier circuit 54*b*. The voltage gain can be increased by the voltage doubling rectifier circuit unit. The compounded structure of the multi-layer printed circuit board (PCB) 52 and the anode/cathode voltage doubling rectifier circuit 54*a*, 54*b* are sandwiched between two magnetic caps 56*a*, 56*b*. The two magnetic caps 56*a*, 56*b* are used to reduce the magnetic fluxes. A plurality of supports 58 are used to fix the PCB 52, the anode/cathode voltage doubling rectifier circuit 54*a*, 54*b* and two magnetic caps 56*a*, 56*b*. The breakdown distance of separated device is kept by supports 58 to increase the durability of breakdown voltage. The top magnetic cap 56*a* has a plurality of fist fixed-holes 58*a* and a first opening 60*a*. The first insulated board 54*a* that the anode voltage doubling rectifier circuit 54*a* is formed on has a plurality of second fixed-holes 58*b* and a second opening 60*b*. The multi-layer printed circuit board (PCB) 52 comprises a plurality of third fixed-holes 58*c* and a third opening 60*c*. The second insulated board 54*b* that the cathode voltage doubling rectifier circuit 54*b* is formed on comprises a plurality of fourth fixed-holes 58*d* and a forth opening 60*d*. The bottom magnetic cap 56*b* comprises a plurality of fifth fixed-holes 58*e* and a fifth opening 60*e*. The magnetic core 50 is compounded of a plurality of I-cores or two U-cores. The appearance of the magnetic core 50 is a close rectangle frame. The one leg 50*a* of the core 50 is passed through the third opening 60*c* of the multi-layer printed circuit board (PCB) 52 and another leg 50*b* is set outside of the multi-layer PCB 52. The high voltage transformer with high voltage output is generated by the ratio of the second winding turns to the primary winding turns.

Figure 7:
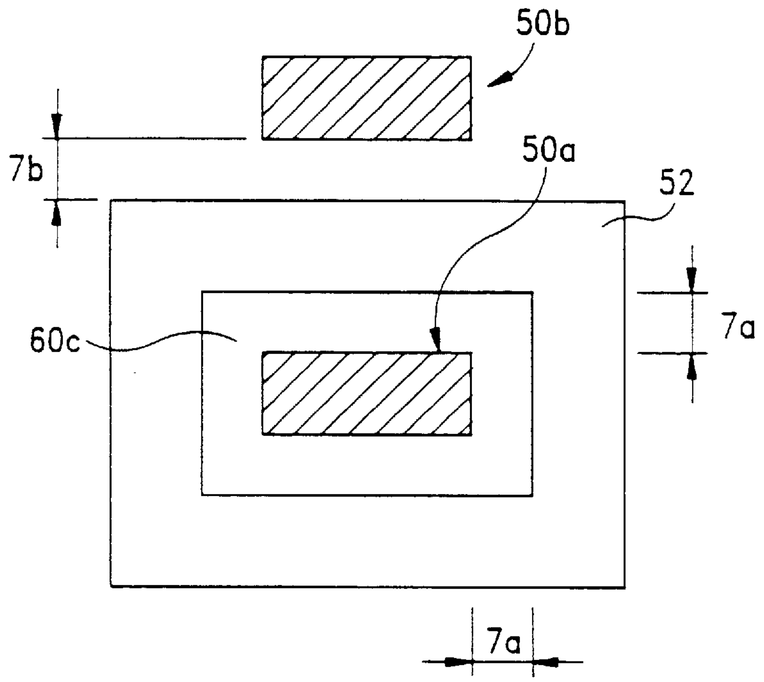
FIG. 7 is a view of showing the breakdown distance according to an embodiment of the present invention.
Figure 8:
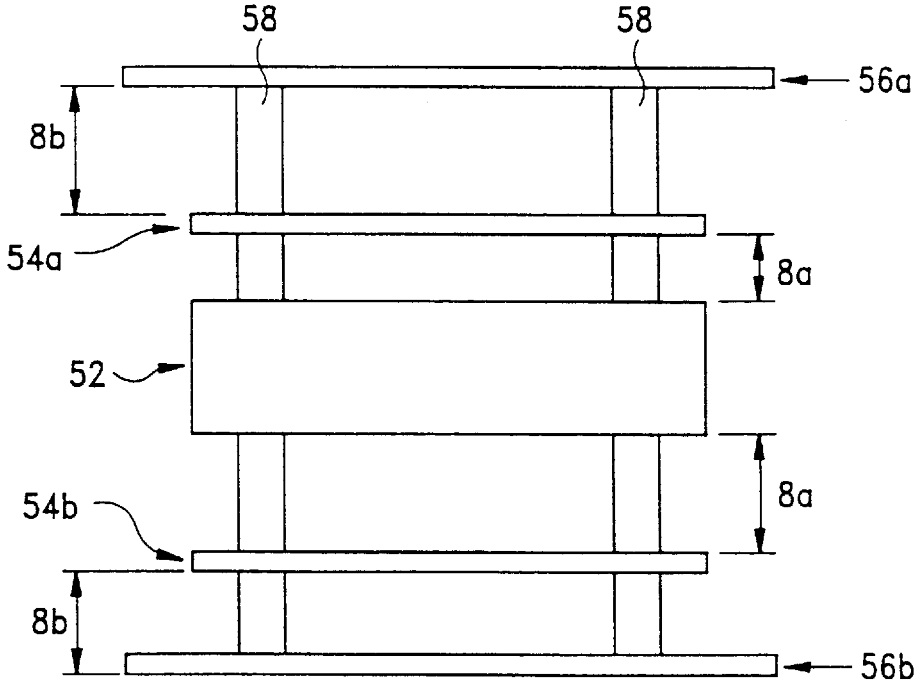
FIG. 8 is a view of showing the breakdown distance according to an embodiment of the present invention.

In the transformer structure, the gap of every device influences the breakdown voltage. Therefore, it becomes very important to concern the gap of every device in designing transformer. Referring to FIG. 7, it shows an embodiment of the present invention. A x-ray power supply is applied to provide a voltage about 150 KV. The breakdown distance 7*a* between the multi-layer PCB 52 and the one leg 50*a* of the magnetic core 50 in the third opening 60*c* of the multi-layer PCB 52 is about 10 mm. The breakdown distance 7*b* between the multi-layer PCB 52 and another leg 50*b* of the magnetic core 50 outside of the multi-layer PCB 52 is also about 10 mm. Also, referring to FIG. 8, the breakdown distance of every device in the transformer is shown. The breakdown distance 8*a* between the anode/cathode voltage doubling rectifier circuit 54*a*, 54*b* and the multi-layer PCB 52 is 15 mm. The breakdown distance 8*b* between the top/bottom magnetic caps 56*a*, 56*b* and the anode/cathode voltage doubling rectifier circuits 54*a*, 54*b* is about 40 mm. The anode/cathode voltage doubling rectifier circuits 54*a*, 54*b* are interposed between the top/bottom magnetic caps 56*a*, 56*b*. The multi-layer PCB 52 is sandwiched between the anode/cathode voltage doubling rectifier circuits 54*a*, 54*b*. A plurality of supports 58 are used to fix the multi-layer PCB 52, the anode/cathode voltage doubling rectifier circuits 54*a*, 54*b* and the top/bottom magnetic caps 56*a*, 56*b*. The supports 58 are composed of a plurality of supporting rods. The breakdown distance of every device is formed by using the supports 58 to increase the durability of breakdown voltage.

The combined structure is positioned into an oil tank with an insulated oil. The insulated oil is then flowed into the compounded structure. The transformer is oil packed by the insulated oil to improve the capability of insulated breakdown voltage.

Accordingly, the present invention provides a transformer structure applied in the high voltage power supply. The relevant breakdown distances, such as the distance between the spiral planar coils of the multi-layer PCB and the magnetic core, the distance between the multi-layer PCB and the anode/cathode voltage doubling rectifier circuits, the distance between the anode/cathode voltage doubling rectifier circuits and the top/bottom magnetic caps, are designed in an appropriate distance. The entire combined structure is oil packed by the insulated oil. This structure can be operated with a high voltage output without inducing abnormal spark discharge. For the conventional planar transformer, although the size of the transformer will be miniaturized by using a multi-layer sandwiching structure, the breakdown distance can not be remained in an appropriate distance. Therefore, the value of breakdown voltage is decreased. Additionally, a typical insulated material such as polymid or ceramic is applied in the insulated breakdown voltage. It is observed that the conventional transformers have the problem of an insufficient breakdown voltage in an x-ray power supply applied. Therefore, the present invention eliminates these disadvantages and provides a new structure. The breakdown distance can be designed in an appropriate distance by using supports. The sandwiching structure and the insulated oil are used to generate an optimal insulated breakdown voltage. The entire structure can be simply combined and fixed. Therefore, the cost can be reduced. Additionally, in the multi-layer PCB structure, the spiral planar coils that are used as secondary winding which can effectively increase the winding turns ratio. The employment of multi-layered printed circuit boards as a secondary winding can ensure a uniform quality in manufacturing process.

Although specific embodiments including the preferred embodiment have been illustrated and described, it will be obvious to those skilled in the art that various modifications may be made without departing from the spirit and scope of the present invention, which is intended to be limited solely by the appended claims.

What is claimed is:

1. A transformer comprising:

a magnetic core for served as the medium of transferring power;

a multi-layer printed circuit board having spiral planar coils inside, said spiral planar coils being used as a secondary winding, said secondary winding are spiraled around said magnetic core;

a conductor winding using as a primary winding, said primary winding spiraled around said magnetic core;

a voltage doubling rectifier means for increasing voltage gain, said voltage doubling rectifier means comprising of an anode voltage doubling rectifier circuit and a cathode voltage doubling rectifier circuit which are respectively formed on a first and a second insulated boards, said multi-layer printed circuit board being sandwiched between said anode voltage doubling rectifier circuit and said cathode voltage doubling rectifier circuit;

a magnetic means for decreasing magnetic flux, said magnetic means comprising a top magnetic cap and a bottom magnetic cap, said multi-layer printed circuit board and said voltage doubling rectifier means being sandwiched between said top magnetic cap and said bottom magnetic cap;

a supporting means for fixing said multi-layer printed circuit board, said voltage doubling rectifier means and said magnetic means; and an amount of insulated oil which is filled into said transformer for increasing breakdown voltage.

2. The transformer of claim 1, wherein said magnetic core comprises a plurality of I-cores, the appearance of said core being close rectangle frame.

3. The transformer of claim 1, wherein said magnetic core comprises two U-cores, the appearance of said core being close rectangle frame.

4. The transformer of claim 1, wherein said top magnetic cap comprises a plurality of first fixed-holes and a first opening, said supporting means mounting into said plurality of first fixed-holes to fix said top magnetic cap, and said magnetic core passing through said first opening.

5. The transformer of claim 1, wherein said first insulated board on which said anode voltage doubling rectifier circuit is formed, comprises a plurality of second fixed-holes and a second opening, said supporting means mounting into said plurality of second fixed-holes to fix said anode voltage doubling rectifier circuit, and said magnetic core passing through said second opening.

6. The transformer of claim 1, wherein said printed circuit board comprises a plurality of third fixed-holes and a third opening, said supporting means mounting into said plurality of third fixed-holes to fix said printed circuit board, and said magnetic core passing through said third opening.

7. The transformer of claim 1, wherein said second insulated board on which said cathode voltage doubling rectifier circuit is formed comprises a plurality of forth fixed-holes and a forth opening, said supporting means mounting into said plurality of forth fixed-holes to fix said cathode voltage doubling rectifier circuit, and said magnetic core passing through said forth opening.

8. The transformer of claim 1, wherein said bottom magnetic cap comprises a plurality of fifth fixed-holes and a fifth opening, said supporting means mounting into said plurality of fifth fixed-holes to fix said bottom magnetic cap, and said magnetic core passing through said fifth opening.

9. The transformer of claim 1, wherein when a voltage condition is provided about 150 KV, the breakdown distance of said transformer comprising:

the breakdown distance between said core and said multi-layer printed circuit board being about 10 mm;

the breakdown distance between said voltage doubling rectifier means and said multi-layer printed circuit board being 15 mm; and the breakdown distance between said magnetic means and said voltage doubling rectifier means being about 40 mm.

10. The transformer of claim 1, wherein said supporting means comprises a plurality of supporting rods.

* * * * *